(12) United States Patent
Chen (10) Patent No.: US 10,783,846 B2
(45) Date of Patent: Sep. 22, 2020

(54) DISPLAY DEVICE AND DRIVING METHOD THEREOF

(71) Applicants: HKC CORPORATION LIMITED, Guangdong (CN); CHONGQING HKC OPTOELECTRONICS TECHNOLOGY CO., LTD., Chongqing (CN)

(72) Inventor: Yu-jen Chen, Taiwan (CN)

(73) Assignees: HKC CORPORATION LIMITED, Guangdon (CN); CHONGQING HKC OPTOELECTRONICS TECHNOLOGY CO. LTD., Chongqing (CN)

( * ) Notice: Subject to any disclaimer, the term of this patent is extended or adjusted under 35 U.S.C. 154(b) by 15 days.

(21) Appl. No.: 15/556,422

(22) PCT Filed: Mar. 3, 2017

(86) PCT No.: PCT/CN2017/075637
§ 371 (c)(1),
(2) Date: Sep. 7, 2018

(87) PCT Pub. No.: WO2018/120413
PCT Pub. Date: Jul. 5, 2018

(65) Prior Publication Data
US 2019/0385548 A1   Dec. 19, 2019

(51) Int. Cl.
*G02F 1/133* (2006.01)
*G09G 3/36* (2006.01)
(Continued)

(52) U.S. Cl.
CPC ..... *G09G 3/3648* (2013.01); *G02F 1/133611* (2013.01); *G09G 3/3406* (2013.01);
(Continued)

(58) Field of Classification Search
CPC ...... G09G 3/22; G09G 3/3607; G09G 3/3406; G02F 1/13306
(Continued)

(56) References Cited

U.S. PATENT DOCUMENTS

2013/0300781 A1   11/2013   Lee

FOREIGN PATENT DOCUMENTS

CN   1658269 A   8/2005
CN   1822086 A   8/2006
(Continued)

OTHER PUBLICATIONS

International Search Report and Written Opinion for PCT/ISA/220 and PCT/ISA/237, International Application No. PCT/CN20171075637, pp. 1-7, International Filing Date Mar. 3, 2017, dated Aug. 30, 2017.

*Primary Examiner* — Abdul-Samad A Adediran
(74) *Attorney, Agent, or Firm* — Bond Schoeneck & King, PLLC; George McGuire (57) ABSTRACT

Provided are a display device and a driving method for the display device. The driving method may include: dividing a frame of to-be-displayed image into m frames of display pictures; in any one of the m frames of display pictures, a difference between a drive voltage and a corresponding preset gray-scale voltage of at least one pixel unit among n pixel units on the display panel is different from a difference between a drive voltage and a corresponding preset gray-scale voltage for each of other ones of the n pixel units in positive and negative signs; for a pixel unit, a difference between at least one of m drive voltages in the m frames of display pictures and a preset gray-scale voltage of the pixel unit is different from a difference between each of other ones of them drive voltages and the preset gray-scale voltage of the pixel unit in positive and negative signs, and an average
(Continued)

luminance value of the pixel unit in the m frames of display pictures equals the preset luminance; and arithmetic products of a backlight luminance and a sum of drive voltages of all pixel units on the display panel for the m frames of pictures are equal to each other.

20 Claims, 3 Drawing Sheets

(51) Int. Cl.
*G09G 3/34* (2006.01)
*G02F 1/13357* (2006.01)
(52) U.S. Cl.
CPC ......... *G09G 3/3607* (2013.01); *G09G 3/3688* (2013.01); *G09G 2310/027* (2013.01)
(58) Field of Classification Search
USPC .......................................................... 345/89
See application file for complete search history.

(56) References Cited

FOREIGN PATENT DOCUMENTS

| | | | |
|---|---|---|---|
| CN | 101751866 | A | 6/2010 |
| CN | 102194424 | A | 9/2011 |
| CN | 102222477 | A | 10/2011 |
| CN | 105185326 | A | 12/2015 |

FIG. 1A

| 110 | | | | | | | |
|---|---|---|---|---|---|---|---|
| R − | G + | B − | W + | R − | G + | B − | W + |
| B + | W − | R + | G − | B + | W − | R + | G − |
| R − | G + | B − | W + | R − | G + | B − | W + |
| B + | W − | R + | G − | B + | W − | R + | G − |

DISPLAY DEVICE AND DRIVING METHOD THEREOF

CROSS-REFERENCE TO RELATED APPLICATIONS

This application is the United States National Stage Application under 35 U.S.C. 371 of PCT Application No. PCT/CN2017/075637 filed on Mar. 3, 2017, which claims priority to Chinese patent application No. 201611226068.7, filed on Dec. 27, 2016, the entire disclosure of each of which is incorporated herein by reference.

TECHNICAL FIELD

The disclosure relates to liquid crystal display (LCD) technologies, for example, a display device and driving method therefor.

BACKGROUND

A large-size LCD panel usually uses the vertical alignment (VA) LCD technology or the in-plane switching (IPS) LCD technology, of which the former has the advantage of higher production efficiency at lower manufacturing costs while the latter has the disadvantage of color cast at a large viewing angle, affecting the display effect.

To compensate color cast on a VA LCD device, a plurality of pixel units on the display panel are usually divided into main pixel units and sub pixel units, and different drive voltages are applied to the main pixel units and the sub-pixel units respectively. In this case, it is usually necessary to add metal wires or thin film transistors to the display panel to drive the sub pixel units, resulting in a decrease in the photic zone and thus affecting luminousness of the panel.

SUMMARY

The disclosure provides a display device and a driving method therefor, which can compensate color cast and improve the image display quality.

A driving method for a display device, comprising: dividing a frame of to-be-displayed image into m frames of display pictures, wherein a preset gray-scale voltage and a preset luminance are set for each pixel unit corresponding to a respective one of pixels of the to-be-displayed image; where in any one of the m frames of display pictures, a difference between a drive voltage and a corresponding preset gray-scale voltage of at least one pixel unit among n pixel units on the display panel differs from a difference between a drive voltage and a corresponding preset gray-scale voltage for each of other ones of the n pixel units in positive and negative signs; where for a pixel unit, a difference between at least one of m drive voltages in the m frames of display pictures and a preset gray-scale voltage of the pixel unit differs from a difference between each of other ones of the m drive voltages and the preset gray-scale voltage of the pixel unit in positive and negative signs, and an average luminance value of the pixel unit in the m frames of display pictures equals the preset luminance; and where an arithmetic product of a backlight luminance and a sum of drive voltages of all pixel units on the display panel for one of the m frames of pictures is equal to an arithmetic product of a backlight luminance and a sum of drive voltages of all pixel units on the display panel for each of other ones of the m frames of pictures, wherein m and n are positive integers greater than or equal to two.

A display device may include: a display panel configured to display a to-be-displayed image which is divided into m frames of display pictures, wherein a preset gray-scale voltage and a preset luminance are set for a pixel unit corresponding to each of pixels of the to-be-displayed image; a backlight unit configured to provide backlight for the display panel; and a drive circuit configured to apply drive voltage to each pixel unit of the display panel in each of the m frames of display picture and adjust the backlight luminance of the backlight unit. Where in any one of the m frames of display pictures, a difference between a drive voltage and a corresponding preset gray-scale voltage of at least one pixel unit among n pixel units on the display panel differs from a difference between a drive voltage and a corresponding preset gray-scale voltage for each of other ones of the n pixel units in positive and negative signs. Where for a pixel unit, a difference between at least one of m drive voltages in the m frames of display pictures and a preset gray-scale voltage of the pixel unit differs from a difference between each of other ones of the m drive voltages and the preset gray-scale voltage of the pixel unit in positive and negative signs, and an average luminance value of the pixel unit in the m frames of display pictures equals the preset luminance. Where an arithmetic product of a backlight luminance and a sum of drive voltages of all pixel units on the display panel for one of the m frames of pictures is equal to an arithmetic product of a backlight luminance and a sum of drive voltages of all pixel units on the display panel for each of other ones of the m frames of pictures, wherein m and n are positive integers greater than or equal to two.

A display panel may include: a display panel configured to display a to-be-displayed image which is divided into 2 frames of display pictures, wherein a preset gray-scale voltage and a preset luminance are set for a pixel unit corresponding to each of pixels of the to-be-displayed image; a backlight unit configured to provide backlight for the display panel; and a drive circuit configured to apply drive voltage to each pixel unit of the display panel in each of the m frames of display picture and adjust the backlight luminance of the backlight unit. Where in either of the two frames of display pictures, the differences between the drive voltages and the corresponding preset grey-scale voltages of two adjacent pixel units of the display panel differ in positive and negative signs. Where two drive voltages of a pixel unit in the two frames of pictures, the difference between one of the two drive voltages and the preset grey-scale voltage of the pixel unit differs from the difference between other one of the two drive voltages and the preset grey-scale voltage of the pixel unit, and the average luminance value of the pixel unit in the two frames of display pictures equals the preset luminance. Where an arithmetic product of a backlight luminance and a sum of drive voltages of all pixel units on the display panel for one of the 2 frames of pictures is equal to an arithmetic product of a backlight luminance and a sum of drive voltages of all pixel units on the display panel for other one of the 2 frames of pictures. Where the differences between the two drive voltages of a pixel unit in the two frames of display pictures and the corresponding reference drive voltage are the same in positive and negative signs, and the reference drive voltage is a common-electrode drive voltage corresponding a zero-gray-scale LCD driver.

In the embodiments, among m drive voltages of any pixel unit, the difference between at least one drive voltage and the preset gray-scale voltage of the pixel unit differs from the differences between other drive voltages and the preset gray-scale voltage of the pixel unit in positive and negative signs, so that after m frames of display pictures are superimposed, the luminance difference between the front view angle and the side view angle decreases, which compensates color cast. In addition, the backlight luminance of each of m frames of display pictures equals after multiplied by the sum of the drive voltages of all pixel units of the display panel, so that luminance of every frame of display picture is equal to each other, which avoids flicker during picture switching.

DETAILED DESCRIPTION

This section describes the disclosure in detail with reference to the embodiments and their accompanying drawings. The following descriptions of the embodiments are intended to illustrate and not to limit the disclosure. It is to be noted that for the sake of easy description, only part of the structures related to the disclosure, not all, are shown in the accompanying drawings. If not in collision, the following embodiments and the features thereof may be combined with each other.

The embodiment provides a drive method for a display device, including: dividing a frame of to-be-displayed image into m frames of display pictures, wherein a preset gray-scale voltage and a preset luminance are set for each pixel unit corresponding to a respective one of pixels of the to-be-displayed image.

Optionally, each of the plurality of pixels of the preset image has a one-to-one correspondence relationship with each of the plurality of pixel units on the array substrate of the display device, when the drive circuit applies different drive voltages to the display device, the preset image is displayed.

In related technologies, an animation is usually composed of a plurality of static images, a frame of image may refer to a static image, that is, the frame is a single static image with the smallest possible unit in an animation and successive frames can form an animation. The frame of image includes a plurality of pixels and each of the plurality of pixels may be set to match a pixel unit on the array substrate. When the frame of image needs to be displayed, the drive circuit applies different drive voltages, namely the preset gray-scale voltages, to the different pixel units, so that the display device displays the frame of image.

In any one of the m frames of display pictures, a difference between the drive voltage and the corresponding preset gray-scale voltage of at least one pixel unit among n pixel units on the display panel differs from the difference between a drive voltage and a corresponding preset gray-scale voltage for each of other ones of the n pixel units in positive and negative signs.

For a pixel unit, a difference between at least one of m drive voltages in the m frames of display pictures and a preset gray-scale voltage of the pixel unit differs from a difference between each of other ones of them drive voltages and the preset gray-scale voltage of the pixel unit in positive and negative signs, and an average luminance value of the pixel unit in the m frames of display pictures equals the preset luminance of the pixel unit.

An arithmetic product of a backlight luminance and a sum of drive voltages of all pixel units on the display panel for one of the m frames of pictures is equal to an arithmetic product of a backlight luminance and a sum of drive voltages of all pixel units on the display panel for each of other ones of the m frames of pictures, wherein m and n are positive integers greater than or equal to two.

When the difference between a drive voltage and a preset gray-scale voltage is positive, the drive voltage is greater than the preset gray-scale voltage; and when the difference between the drive voltage and the preset gray-scale voltage is negative, the drive voltage is less than the preset gray-scale voltage. Optionally, since the luminance change of the front view angle and that of the side view angle are different after the m frames of display pictures are superimposed when the drive voltages take changes. The luminance difference between the front view angle and the side view angle is small when the drive voltage is larger than the preset gray-scale voltage or is less than the preset gray-scale voltage. Compared to the scheme where the same drive voltages are applied to the same pixel unit in different display pictures, the luminance difference between the front view angle and the side view angle is less in the scheme where different drive voltages are applied to the same pixel unit in different display pictures and where some drive voltages applied to the corresponding pixel units are high voltages that are greater than the preset grey-scale voltages while other drive voltages applied to the corresponding pixel units are low voltages that are less than the preset grey-scale voltages, thereby compensating color cast of the display image. The drive voltage of each pixel unit in each frame of display picture can be adjusted flexibly according to the required viewing angle range of the display panel.

In the embodiment, a frame of the to-be-displayed image is divided into m frames of display pictures in time sequence, the average backlight luminance value of a pixel unit equals the preset luminance of the pixel unit, so that after superimposed, the sequentially displayed m frames of display pictures form the to-be-displayed image. For any pixel unit, the difference between at least one of m drive voltages in the m frames of display picture and a preset gray-scale voltage of the pixel unit differs from a difference between each of other ones of the m drive voltages and the preset gray-scale voltage of the pixel unit in positive and negative signs, that is, some of the m drive voltages are greater than the preset grey-scale voltage of the pixel unit while others of the m drive voltages are less than the preset grey-scale voltage of the pixel unit, so that the luminance difference between the front view angle and the side view angle of the pixel unit decreases after the m frames of display pictures are sequentially displayed and superimposed, thereby compensating color cast of the display device.

In addition, in the same frame of display picture, a difference between a drive voltage and a corresponding preset gray-scale voltage of at least one pixel unit among n pixel units on the display panel differs from a difference between a drive voltage and a corresponding preset gray-scale voltage for each of other ones of the n pixel units in positive and negative signs. When the difference between the drive voltage of the pixel unit and the preset gray-scale voltage of the pixel unit is positive, the display luminance of the pixel unit is higher than that of the corresponding pixel in the to-be-displayed image. When the difference between the drive voltage of the pixel unit and the preset gray-scale voltage of the pixel unit is negative, the display luminance of the pixel unit is lower than that of the corresponding pixel in the to-be-displayed image.

Among the m frames of display pictures, in the same frame of display picture, the differences between the drive voltages and the matching preset gray-scale voltages are different in positive and negative signs, so that in the same frame of display picture, there is an even drive voltage distribution and a more even luminance distribution, avoiding the same positive and negative signs of the differences between the drive voltages and the corresponding preset gray-scale voltages of all pixel units in the same display picture and an uneven luminance distribution in the same display picture, which causes flicker during picture switching. In addition, an arithmetic product of a backlight luminance and a sum of drive voltages of all pixel units on the display panel for one of the m frames of pictures is equal to an arithmetic product of a backlight luminance and a sum of drive voltages of all pixel units on the display panel for each of other ones of them frames of pictures, which avoids flicker during picture switching.

In the embodiment, a frame of the to-be-displayed image is divided into m frames of display pictures in time sequence, drive voltages applied to pixel units in each frame of display picture are adjusted and backlight luminance of the backlight unit of each frame of display picture is also adjusted, which reduce color difference of the display device and thereby avoids flicker during picture switching and improves the image display quality. In addition, there is no need to increase the number of metal wires or thin film transistors in the embodiment, thereby improving the aperture ratio of the display panel.

To give an example, a frame of the to-be-displayed image is divided into m frames of display pictures, the backlight luminance of the first frame of display picture is L1, the backlight luminance of the second frame of display picture is L2, . . . , and the backlight luminance of the mth frame of display picture is Lm; the total drive voltage of all pixel units of the display panel in the first frame of display picture is R1, the total drive voltage of all pixel units of the display panel in the second frame of display picture is R2, . . . , and the total drive voltage of all pixel units of the display panel in the mth frame of display picture is Rm. The backlight luminance of the to-be-displayed image is L and the total preset gray-scale voltage of all pixel units is R. Since the drive voltage of a pixel unit is in direct proportion to the luminousness of the pixel unit, the formula (R1*L1+R2*L2+ . . . +Rm*Lm)/m can reflect the average display luminance of the m frames of display pictures and the formula R*L can reflect the display luminance of the to-be-displayed image. Since the average luminance of the m frames of display pictures of a pixel unit equals the preset luminance of the pixel unit of the to-be-displayed image, the method according to the embodiment conforms to the formula (R1*L1+R2*L2+ . . . +Rm*Lm)/m=R*L, that is, the average luminance of the m frames of display pictures equals the luminance of the to-be-displayed image, so that the luminance of the m frames of superimposed display pictures equals the luminance of the to-be-displayed image, thereby improving the image display quality.

Optionally, the frame of the to-be-displayed image is divided into two frames of display pictures, a difference between a drive voltage and a preset grey-scale voltage for a pixel unit in one of the two frames of display pictures differs from a difference between a drive voltage and the preset grey-scale voltage for the pixel unit in the other one of the two frames of display pictures in positive and negative signs.

Figure 1A:
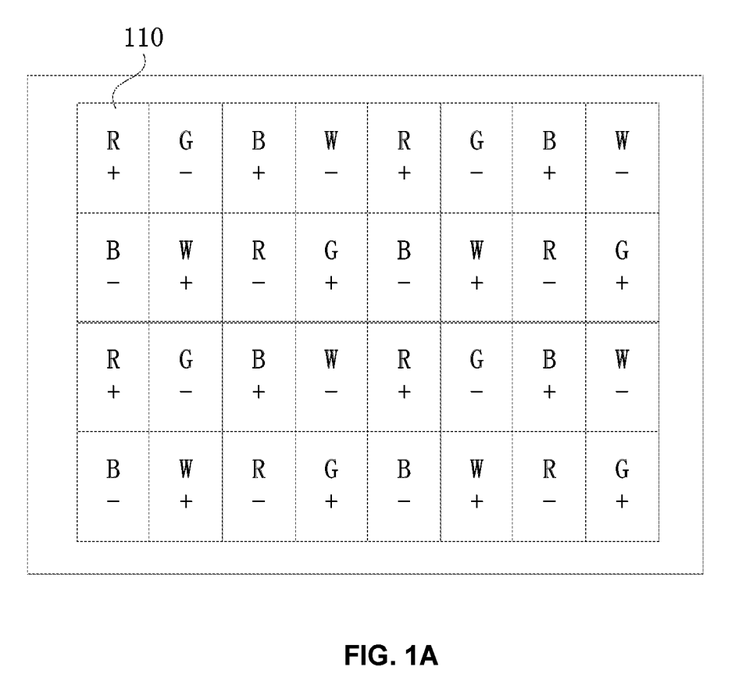
FIG. 1a shows a schematic diagram of a first frame of display picture according to the embodiment.
Figure 1B:
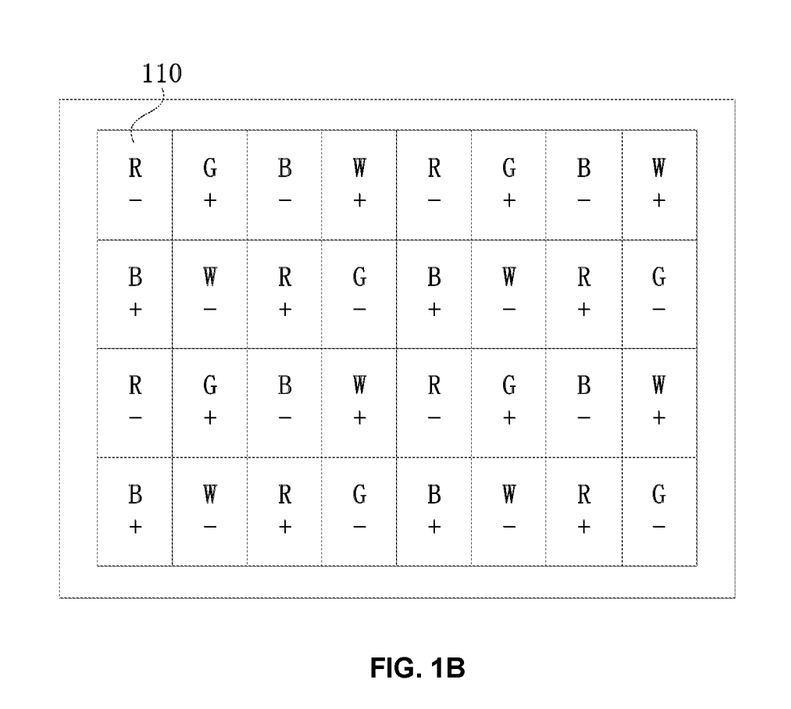
FIG. 1b shows a schematic diagram of a second frame of display picture according to the embodiment.

FIG. 1a shows a schematic diagram of the first frame of display picture according to the embodiment and FIG. 1b shows the second frame of display picture according to the embodiment. In FIG. 1a and FIG. 1b, "+" indicates the difference between the drive voltage of a pixel unit and the preset gray-scale voltage of the pixel unit is greater than zero while "−" indicates the difference between the drive voltage of a pixel unit and the preset gray-scale voltage of the pixel unit is less than zero. Take the red sub-pixel unit 110 as an example, with a high voltage that is greater than the preset gray-scale voltage is used as the drive voltage in the first frame of display picture and a low voltage that is less than the preset gray-scale voltage used as the drive voltage in the second frame of display picture, the red sub-pixel unit 110 has a luminance difference between the front view angle and the side view angle less than that of the to-be-displayed image in both the first frame of display picture and the second frame of display picture, so that the luminance difference between the front view angle and the side view angle of the two frames of superimposed display pictures decreases compared with that of the to-be-displayed image, thereby compensating color cast and improving image quality. It is to be noted that FIG. 1a and FIG. 1b just illustrate that the display panel includes red (R), green (G), blue (B) and white (W) sub-pixel units but not limit the disclosure, other embodiments may include only red (R), green (G) and blue (B) sub-pixel units or include sub-pixel units in other colors.

Optionally, in any one of the m frames of display pictures, the differences between the drive voltages and the corresponding preset grey-scale voltages of two adjacent pixel units of the display panel differ in positive and negative signs.

In the exemplary embodiment with reference to FIG. 1a and FIG. 1b, low drive voltages and high drive voltages are alternatively distributed for a plurality of pixel units on the display panel in the same frame of display picture, so that the average drive voltage of all pixel units varies only slightly with different frames of display pictures, thereby avoiding flicker caused by different average luminance values between different frames of display pictures during picture switching.

Optionally, the differences between the m drive voltages of a pixel unit in the m frames of display pictures and a reference drive voltage of the pixel unit are the same in positive and negative signs.

Optionally, the reference drive voltage may be a common-electrode drive voltage corresponding a zero-gray-scale LCD driver. The differences between the m drive voltages of a pixel unit in m frames of display pictures and a reference drive voltage of the pixel unit may be the same in positive and negative signs, that is, the m drive voltages may all be greater than or may all be less than the reference drive voltage. In the exemplary embodiment with reference to FIG. 1a and FIG. 1b, the two drive voltages of the red sub-pixel unit 110 respectively in the first frame of display picture and the second frame of display picture may both be greater than the reference drive voltage.

Optionally, the differences between the m drive voltages of a pixel unit in m frames of display pictures and a reference drive voltage of the pixel unit may differ in positive and negative signs, that is, among the m drive voltages, some are greater than the reference drive voltage while others are less than the reference drive voltage. In the exemplary embodiment with reference to FIG. 1a and FIG. 1b, the drive voltage of the red sub-pixel unit 110 in the first frame of display picture may be greater than the reference drive voltage while that in the second frame of display picture may be less than the reference drive voltage.

Optionally, a high drive frequency may cause loss of resources and energy and a high manufacturing cost for the display panel, while with the method according to the embodiment, the display panel provides high-quality display pictures at an appropriately low drive frequency or at the original drive frequency, thereby reducing the manufacturing cost of the display device while providing high-quality display pictures.

Optionally, the display panel is an LCD panel with VA or horizontal alignment (HA) or a display panel whose color cast needs to be compensated. The use of the drive method for a display device according to the embodiment can compensate color cast at a large viewing angle and improve the image display quality for an LCD panel.

In the embodiment, for a pixel unit, a difference between at least one of m drive voltages in the m frames of display pictures and a preset gray-scale voltage of the pixel unit differs from a difference between each of other ones of the m drive voltages and the preset gray-scale voltage of the pixel unit in positive and negative signs, so that after the m frames of display pictures are superimposed, the luminance difference between the front view angle and the side view angle is small, which reduces color difference. In addition, an arithmetic product of a backlight luminance and a sum of drive voltages of all pixel units on the display panel for one of the m frames of pictures is equal to an arithmetic product of a backlight luminance and a sum of drive voltages of all pixel units on the display panel for each of other ones of the m frames of pictures, wherein m and n are positive integers greater than or equal to two, which avoids flicker during picture switching.

Figure 2:
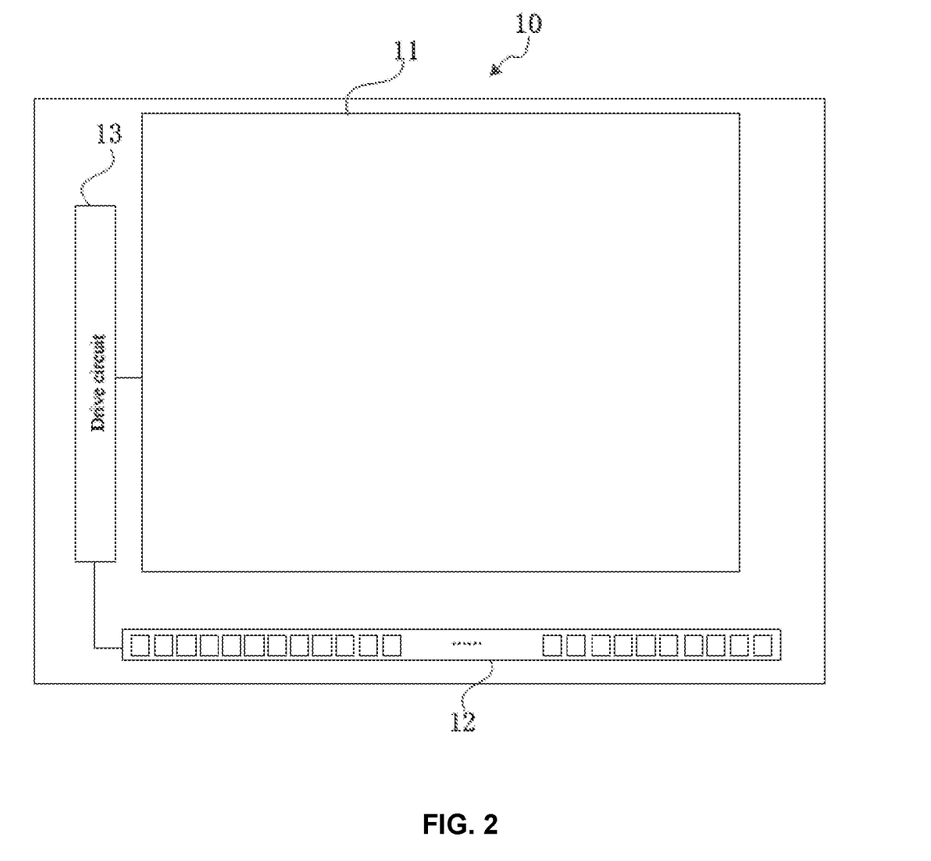
FIG. 2 shows a schematic diagram of a display device according to the embodiment.

FIG. 2 shows a schematic diagram of a display device according to the embodiment. In FIG. 2, a display device 10 includes a display panel 11, a backlight unit 12 and a drive circuit 13.

The display panel 10 is configured to display a to-be-displayed image which is divided into m frames of display pictures, wherein a preset gray-scale voltage and a preset luminance are set for a pixel unit corresponding to each of pixels of the to-be-displayed image.

The backlight unit 12 is configured to provide backlight for the display panel.

The drive circuit 13 is configured to apply drive voltage to each pixel unit of the display panel in each of the m frames of display picture and adjust the backlight luminance of the backlight unit.

Optionally, in any one of the m frames of display pictures, a difference between a drive voltage and a corresponding preset gray-scale voltage of at least one pixel unit among n pixel units on the display panel differs from a difference between a drive voltage and a corresponding preset gray-scale voltage for each of other ones of the n pixel units in positive and negative signs.

Optionally, for a pixel unit, a difference between at least one of m drive voltages in the m frames of display pictures and a preset gray-scale voltage of the pixel unit differs from a difference between each of other ones of the m drive voltages and the preset gray-scale voltage of the pixel unit in positive and negative signs, and an average luminance value of the pixel unit in the m frames of display pictures equals the preset luminance.

Optionally, an arithmetic product of a backlight luminance and a sum of drive voltages of all pixel units on the display panel for one of the m frames of pictures is equal to an arithmetic product of a backlight luminance and a sum of drive voltages of all pixel units on the display panel for each of other ones of the m frames of pictures, wherein m and n are positive integers greater than or equal to two.

Optionally, the average display luminance of the m frames of display pictures equals the display luminance of the to-be-displayed image.

Optionally, the display panel is configured to display the to-be-displayed image that comprises the first frame of display picture and the second frame of display picture; and the drive circuit is configured to provide the first drive voltage for a pixel unit in the first frame of display picture and provide the second drive voltage for the pixel unit in the second frame of display picture, wherein the difference between the first drive voltage and the preset grey-scale voltage of the pixel unit differs from the difference between the second drive voltage and the preset grey-scale voltage of the pixel unit in positive and negative signs. Optionally, the drive circuit is configured to provide drive voltages for the pixel units in any one of the m frames of display pictures, wherein differences between the drive voltages and corresponding preset grey-scale voltages of two adjacent pixel units of the display panel differ in positive and negative signs.

Optionally, the drive circuit is configured to provide m drive voltages for a pixel unit respectively, the difference between each of the m drive voltages and the reference drive voltage of the pixel unit is the same as the difference between one of others of them drive voltages and the reference drive voltage of the pixel unit in positive and negative signs.

Optionally, the drive circuit is configured to provide m drive voltages for a pixel unit respectively, the difference between each of the m drive voltages and the reference drive voltage of the pixel unit differs from the difference between one of others of the m drive voltages and the reference drive voltage of the pixel unit in positive and negative signs.

Optionally, the display panel is an LCD panel with VA or HA.

The display device according to the embodiment is based on the drive method for a display device according to any embodiment of the disclosure and can use this method. For technical details not described in detail in the embodiment, see the technical scheme for the drive method for a display device provided in any embodiment of the disclosure.

INDUSTRIAL APPLICABILITY

The disclosure provides a display device and a driving method for the display device, thereby compensating color cast and improving the image display quality for the display device.

What is claimed is:
1. A driving method for a display device, comprising:
dividing a frame of to-be-displayed image into m frames of display pictures, wherein a preset gray-scale voltage and a preset luminance are determined for each pixel unit corresponding to a respective one of pixels of the to-be-displayed image;
wherein in any one of the m frames of display pictures, a difference between a drive voltage and a corresponding preset gray-scale voltage for each of at least one pixel unit among n pixel units on a display panel is different from a difference between a drive voltage and a cor- responding preset gray-scale voltage for each of other ones of the n pixel units in positive and negative signs;

wherein for the each pixel unit, a difference between each of at least one of m drive voltages in the m frames of display pictures and a preset gray-scale voltage of the each pixel unit is different from a difference between each of other ones of the m drive voltages and the preset gray-scale voltage of the each pixel unit in positive and negative signs, and an average luminance value of the each pixel unit in the m frames of display pictures equals the preset luminance; and wherein an arithmetic product of a backlight luminance and a sum of drive voltages of all pixel units on the display panel for one of the m frames of display pictures is equal to an arithmetic product of a backlight luminance and a sum of drive voltages of all pixel units on the display panel for each of other ones of the m frames of display pictures, and m and n are positive integers greater than or equal to two.

2. The method according to claim 1, wherein the frame of to-be-displayed image is divided into two frames of display pictures, wherein for the each pixel unit, differences between a drive voltage and a preset grey-scale voltage for the each pixel unit in one of the two frames of display pictures is different from a difference between a drive voltage and the preset grey-scale voltage for the each pixel unit in another one of the two frames of display pictures in positive and negative signs.

3. The method according to claim 1, wherein
in the any one of the m frames of display pictures, differences between drive voltages and their respective preset grey-scale voltages of two adjacent pixel units of the display panel are different in positive and negative signs.

4. The method according to claim 1, wherein for the each pixel unit, differences between the m drive voltages of the each pixel unit in the m frames of display pictures and a reference drive voltage of the each pixel unit are same in positive and negative signs.

5. The method according to claim 1, wherein for the each pixel unit, differences between the m drive voltages of the each pixel unit in the m frames of display pictures and a reference drive voltage of the each pixel unit are different in positive and negative signs.

6. The method according to claim 4, wherein the reference drive voltage is a common-electrode drive voltage corresponding a zero-gray-scale LCD driver.

7. The method according to claim 1, wherein the display panel is an LCD panel with vertical alignment or horizontal alignment.

8. The method according to claim 1, wherein each of the pixel units comprises a red sub-pixel unit, a green sub-pixel unit and a blue sub-pixel unit.

9. The method according to claim 8, wherein each of the pixel units further comprises a white sub-pixel unit.

10. A display device, comprising:
a display panel configured to display a frame of to-be-displayed image which is divided into m frames of display pictures, wherein a preset gray-scale voltage and a preset luminance are determined for each pixel unit corresponding to a respective one of pixels of the to-be-displayed image;
a backlight unit configured to provide backlight for the display panel; and
a drive circuit configured to apply drive voltage to the each pixel unit of the display panel in each of the m frames of display picture and adjust a backlight luminance of the backlight unit, wherein in any one of the m frames of display pictures, a difference between a drive voltage and a corresponding preset gray-scale voltage of each of at least one pixel unit among n pixel units on the display panel is different from a difference between a drive voltage and a corresponding preset gray-scale voltage for each of other ones of the n pixel units in positive and negative signs;

wherein for the each pixel unit, a difference between each of at least one of m drive voltages in the m frames of display pictures and a preset gray-scale voltage of the each pixel unit is different from a difference between each of other ones of the m drive voltages and the preset gray-scale voltage of the each pixel unit in positive and negative signs, and an average luminance value of the each pixel unit in the m frames of display pictures equals the preset luminance; and wherein an arithmetic product of a backlight luminance and a sum of drive voltages of all pixel units on the display panel for one of the m frames of display pictures is equal to an arithmetic product of a backlight luminance and a sum of drive voltages of all pixel units on the display panel for each of other ones of the m frames of display pictures, wherein m and n are positive integers greater than or equal to two.

11. The device according to claim 10, wherein
the display panel is configured to display the to-be-displayed image that comprises a first frame of display picture and a second frame of display picture; and
the drive circuit is configured to provide a first drive voltage for any one pixel unit in the first frame of display picture and provide a second drive voltage for any one pixel unit in the second frame of display picture,
wherein a difference between the first drive voltage and a preset grey-scale voltage of the any one pixel unit in the first frame of display picture is different from a difference between the second drive voltage and a preset grey-scale voltage of the any one pixel unit in the second frame of display picture in positive and negative signs.

12. The device according to claim 10, wherein
the drive circuit is configured to provide a drive voltages for the each pixel units in any one of them frames of display pictures, wherein in the any one of them frames of display pictures, differences between drive voltages and corresponding preset grey-scale voltages of two adjacent pixel units of the display panel are different in positive and negative signs.

13. The device according to claim 10, wherein
the drive circuit is configured to, in the m frames of display pictures, provide m drive voltages for the each pixel unit, wherein differences between the m drive voltages and a reference drive voltage of the each pixel unit are same in positive and negative signs.

14. The device according to claim 10, wherein the drive circuit is configured to, in the m frames of display pictures, provide m drive voltages for the each pixel unit, wherein differences between the m drive voltages and a reference drive voltage of the each pixel unit is different in positive and negative signs.

15. The device according to claim 13, wherein the reference drive voltage is a common-electrode drive voltage corresponding a zero-gray-scale LCD driver.

16. The device according to claim 10, wherein each of the pixel units comprise a red sub-pixel unit, a green sub-pixel unit and a blue sub-pixel unit.

17. The device according to claim 16, wherein each of the pixel units further comprises a white sub-pixel unit.

18. The device according to claim 10, wherein the display panel is an LCD panel with VA.

19. The device according to claim 10, wherein the display panel is an LCD panel with HA.

20. A display device, comprising:
- a display panel configured to display a frame of to-be-displayed image which is divided into two frames of display pictures, wherein a preset gray-scale voltage and a preset luminance are determined for each pixel unit corresponding to a respective one of pixels of the to-be-displayed image;
- a backlight unit configured to provide backlight for the display panel; and
- a drive circuit configured to apply a drive voltage to the each pixel unit of the display panel in each of the two frames of display pictures and adjust a backlight luminance of the backlight unit,
- wherein for two drive voltages of two adjacent pixel units in either of the two frames of display pictures, differences between the two drive voltages of the two adjacent pixel units and their respective preset grey-scale voltages are different in positive and negative signs;
- wherein for two drive voltages of the each pixel unit in the two frames of display pictures, differences between the two drive voltages of the each pixel unit and the preset grey-scale voltage of the each pixel unit are different and the average luminance value of the each pixel unit in the two frames of display pictures equals the preset luminance;
- wherein an arithmetic product of a backlight luminance and a sum of drive voltages of all pixel units on the display panel for one of the two frames of display pictures is equal to an arithmetic product of a backlight luminance and a sum of drive voltages of all pixel units on the display panel for another one of the two frames of display pictures; and
- wherein for the each pixel unit, differences between the two drive voltages of the each pixel unit in the two frames of display pictures and reference drive voltage of the each pixel unit are same in positive and negative signs, and the reference drive voltage is a common-electrode drive voltage corresponding a zero-gray-scale LCD driver.

* * * * *